(12) United States Patent
Hanna et al.

(10) Patent No.: US 12,509,236 B1
(45) Date of Patent: Dec. 30, 2025

(54) CONTROL ASSEMBLY FOR AIRCRAFT PROPULSION SYSTEMS

(71) Applicant: Pratt & Whitney Canada Corp., Longueuil (CA)

(72) Inventors: Michael Hanna, Beaconsfield (CA); Jing Fang, Toronto (CA)

(73) Assignee: Pratt & Whitney Canada Corp., Longueuil (CA)

( * ) Notice: Subject to any disclaimer, the term of this patent is extended or adjusted under 35 U.S.C. 154(b) by 0 days.

(21) Appl. No.: 18/759,054

(22) Filed: Jun. 28, 2024

(51) Int. Cl.
  *B64D 27/33* (2024.01)
  *B64D 31/18* (2024.01)

(52) U.S. Cl.
  CPC .............. *B64D 27/33* (2024.01); *B64D 31/18* (2024.01)

(58) Field of Classification Search
  CPC ......... B64D 27/33; B64D 31/18; B64D 27/24
  See application file for complete search history.

(56) References Cited

U.S. PATENT DOCUMENTS

| | | | |
|---|---|---|---|
| 9,382,011 | B2 | 7/2016 | Darby |
| 9,556,800 | B2 | 1/2017 | Tezuka |
| 11,549,464 | B2 | 1/2023 | Terwilliger |
| 11,597,526 | B2 | 3/2023 | Mark |
| 11,649,038 | B2 | 5/2023 | Michael |
| 11,697,505 | B2 | 7/2023 | Thomassin |
| 11,720,067 | B2 | 8/2023 | Hart |
| 11,794,916 | B2 | 10/2023 | Mark |
| 2015/0183511 | A1 | 7/2015 | Ott |
| 2019/0322379 | A1* | 10/2019 | Mackin .................... B64D 27/10 |
| 2021/0300576 | A1* | 9/2021 | Thomassin ............ B64D 35/08 |
| 2022/0135240 | A1* | 5/2022 | Imel ...................... B64D 27/02 60/716 |
| 2022/0234748 | A1 | 7/2022 | Mark |
| 2023/0332547 | A1 | 10/2023 | Schafer |
| 2024/0007025 | A1* | 1/2024 | Trawick ................. B64D 31/00 |
| 2024/0034478 | A1* | 2/2024 | Tabar ..................... B64D 31/18 |
| 2024/0113513 | A1 | 4/2024 | Syed |
| 2024/0367807 | A1* | 11/2024 | Freer ..................... B64D 27/02 |

OTHER PUBLICATIONS

EP Search Report for EP Patent Application No. 25186014.4 dated Oct. 7, 2025.

* cited by examiner

*Primary Examiner* — Rodney A Bonnette
(74) *Attorney, Agent, or Firm* — Getz Balich LLC

(57) ABSTRACT

An aircraft propulsion system assembly includes an aircraft propulsion system and a control assembly. The aircraft propulsion system includes a propulsor, an engine, and an electric motor. The engine includes a rotational assembly coupled to the propulsor. The electric motor includes a rotor coupled to the propulsor. The control assembly includes a propulsion system sensor assembly, a plurality of channel A control units, and at least one channel B control unit. The propulsion system sensor assembly is configured to measure one or both of a rotation speed and a torque of the propulsor. The plurality of channel A control units includes an engine control unit and an electric motor control unit. The channel B control unit is configured to identify valid and invalid output control signals of the engine control unit and the electric motor control unit using the one or both of the rotation speed and the torque.

20 Claims, 9 Drawing Sheets

CONTROL ASSEMBLY FOR AIRCRAFT PROPULSION SYSTEMS

TECHNICAL FIELD

This disclosure relates to a control assembly for controlling an aircraft propulsion system propulsor.

BACKGROUND OF THE ART

Hybrid-electric propulsion system architectures for aircraft may typically include one or more engines (e.g., gas turbine engines) and one or more electric motors configured to facilitate aircraft propulsion. Various control assemblies for controlling operation of the engine(s) and electric motor(s) of a hybrid-electric propulsion system are known. While these known control assemblies may be suitable for their intended purposes, there is always room in the art for improvement.

SUMMARY

It should be understood that any or all of the features or embodiments described herein can be used or combined in any combination with each and every other feature or embodiment described herein unless expressly noted otherwise.

According to an aspect of the present disclosure, an aircraft propulsion system assembly includes a first aircraft propulsion system and a control assembly. The first aircraft propulsion system includes a first propulsor, a first engine, and a first electrical assembly. The first engine includes a first rotational assembly configured for rotation about a first engine rotational axis of the first engine. The first rotational assembly is coupled to the first propulsor. The first electrical assembly includes a first electric motor. The first electric motor includes a first rotor. The first rotor is coupled to the first propulsor. The control assembly includes a propulsion system sensor assembly, a plurality of channel A control units, and at least one channel B control unit. The propulsion system sensor assembly is configured to directly measure one or both of a first rotation speed and a first torque of the first propulsor. The plurality of channel A control units includes a first engine control unit for the first engine and a first electric motor control unit for the first electric motor. The at least one channel B control unit is connected in signal communication with the propulsion system sensor assembly, the first engine control unit, and the first electric motor control unit. The at least one channel B control unit includes a processor connected in signal communication with non-transitory memory including instructions which, when executed by the processor, cause the processor to identify valid and invalid output control signals of the first engine control unit and the first electric motor control unit using the one or both of the first rotation speed and the first torque.

In any of the aspects or embodiments described above and herein, the first aircraft propulsion system may further include a gear box, and the gear box may couple the first rotational assembly and the first rotor to the first propulsor.

In any of the aspects or embodiments described above and herein, the at least one channel B control unit may be a single channel B control unit connected in signal communication with the propulsion system sensor assembly, the first engine control unit, and the first electric motor control unit.

In any of the aspects or embodiments described above and herein, the first engine control unit and the first electric motor control unit may be connected in signal communication with the propulsion system sensor assembly.

In any of the aspects or embodiments described above and herein, the aircraft propulsion system assembly may further include a second aircraft propulsion system including a second propulsor, a second engine, and a second electrical assembly. The second engine may include a second rotational assembly configured for rotation about a second engine rotational axis of the second engine. The second rotational assembly may be coupled to the second propulsor. The second electrical assembly may include a second electric motor. The second electric motor may include a second rotor. The second rotor may be coupled to the second propulsor. The propulsion system sensor assembly may be configured to directly measure one or both of a second rotation speed and a second torque of the second propulsor. The plurality of channel A control units may include a second engine control unit for the second engine and a second electric motor control unit for the second electric motor. The at least one channel B control unit may be connected in signal communication with the second engine control unit and the second electric motor control unit. The instructions, when executed by the processor, may further cause the processor to identify valid and invalid output control signals of the second engine control unit and the second electric motor control unit using the one or both of the second rotation speed and the second torque.

In any of the aspects or embodiments described above and herein, the at least one channel B control unit may include a first channel B control unit and a second channel B control unit. The first channel B control unit may be connected in signal communication with the first engine control unit and the first electric motor control unit. The second channel B control unit may be connected in signal communication with the second engine control unit and the second electric motor control unit.

In any of the aspects or embodiments described above and herein, the at least one channel B control unit may include a single channel B control unit connected in signal communication with the first engine control unit, the first electric motor control unit, the second engine control unit, and the second electric motor control unit.

In any of the aspects or embodiments described above and herein, the first engine control unit, the first electric motor control unit, the second engine control unit, and the second electric motor control unit may be connected in signal communication with the propulsion system sensor assembly.

In any of the aspects or embodiments described above and herein, the propulsion system sensor assembly may include a first sensor assembly and a second sensor assembly. The first sensor assembly may be configured to directly measure the one or both of the first rotation speed and the first torque of the first propulsor. The second sensor assembly may be configured to directly measure the one or both of the second rotation speed and the second torque of the second propulsor.

In any of the aspects or embodiments described above and herein, the first engine control unit and the first electric motor control unit may be connected in signal communication with the first sensor assembly and the second engine control unit and the second electric motor control unit may be connected in signal communication with the second sensor assembly.

According to another aspect of the present disclosure, an aircraft propulsion system assembly includes a cockpit control system, an aircraft propulsion system, and a control assembly. The aircraft propulsion system includes a propulsor, an engine, and an electrical assembly. The engine includes a rotational assembly configured for rotation about an engine rotational axis of the engine. The rotational assembly is coupled to the propulsor. The electrical assembly includes an electric motor. The electric motor includes a rotor. The rotor is coupled to the propulsor. The control assembly includes a propulsion system sensor assembly, a plurality of channel A control units, and at least one channel B control unit. The propulsion system sensor assembly includes a plurality of sensors configured to directly measure one or both of a rotation speed and a torque of the propulsor. The propulsion system sensor assembly is connected in signal communication with the cockpit control system and the at least one channel B control unit. The plurality of channel A control units includes an engine control unit for the engine and an electric motor control unit for the electric motor. The engine control unit is configured to generate an output engine control signal for operation of the engine based on an input engine command signal from the cockpit control system. The electric motor control unit is configured to generate an output electric motor control signal for operation of the electric motor based on an input electric motor command signal from the cockpit control system. The at least one channel B control unit includes a processor connected in signal communication with non-transitory memory including instructions which, when executed by the processor, cause the processor to identify valid and invalid output control signals of the output engine motor control signal and the output electric motor control signal using the one or both of the rotation speed and the torque.

In any of the aspects or embodiments described above and herein, the plurality of sensors may include at least one channel A sensor and at least one channel B sensor. Each of the at least one channel A sensor and the at least one channel B sensor may be configured to directly measure the one or both of the rotation speed and the torque of the propulsor. The at least one channel A sensor may be connected in signal communication with the cockpit control system. The at least one channel B sensor may be connected in signal communication with the at least one channel B control unit.

In any of the aspects or embodiments described above and herein, the instructions, when executed by the processor, may further cause the processor to identify the valid and invalid output control signals of the output engine motor control signal and the output electric motor control signal using the one or both of the rotation speed and the torque directly measured by the at least one channel B sensor.

In any of the aspects or embodiments described above and herein, the at least one channel B control unit may be a single channel B control unit connected in signal communication with the at least one channel B sensor, the engine control unit, and the electric motor control unit.

In any of the aspects or embodiments described above and herein, each sensor of the plurality of sensors may be mechanically arranged downstream of the rotational assembly and the rotor to directly measure the one or both of a rotation speed and a torque of the propulsor.

According to another aspect of the present disclosure, an aircraft propulsion system assembly includes a cockpit control system, an aircraft propulsion system, and a control assembly. The aircraft propulsion system includes a propulsor, an engine, and an electrical assembly. The engine includes a rotational assembly configured for rotation about an engine rotational axis of the engine. The rotational assembly is coupled to the propulsor. The electrical assembly includes an electric motor. The electric motor includes a rotor. The rotor is coupled to the propulsor. The control assembly includes a propulsion system sensor assembly, a plurality of channel A control units, and at least one channel B control unit. The propulsion system sensor assembly includes a plurality of sensors configured to directly measure one or both of a rotation speed and a torque of the propulsor. The propulsion system sensor assembly is connected in signal communication with the cockpit control system, the plurality of channel A control units, and the at least one channel B control unit. The plurality of channel A control units includes an engine control unit for the engine and an electric motor control unit for the electric motor. The engine control unit is configured to generate an output engine control signal for operation of the engine based on the one or both of the rotation speed and the torque. The electric motor control unit is configured to generate an output electric motor control signal for operation of the electric motor based on one or both of the rotation speed and the torque. The at least one channel B control unit includes a processor connected in signal communication with non-transitory memory including instructions which, when executed by the processor, cause the processor to identify valid and invalid output control signals of the output engine motor control signal and the output electric motor control signal using the one or both of the rotation speed and the torque.

In any of the aspects or embodiments described above and herein, the cockpit control system may include a manual override for the output engine control signal and the output electric motor control signal.

In any of the aspects or embodiments described above and herein, each sensor of the plurality of sensors may be mechanically arranged downstream of the rotational assembly and the rotor to directly measure the one or both of a rotation speed and a torque of the propulsor.

In any of the aspects or embodiments described above and herein, the aircraft propulsion system may further include a gear box, and the gear box may couple the rotational assembly and the rotor to the propulsor.

In any of the aspects or embodiments described above and herein, the at least one channel B control unit may include a single channel B control unit connected in signal communication with the engine control unit, the electric motor control unit, and the propulsion system sensor assembly.

The present disclosure, and all its aspects, embodiments and advantages associated therewith will become more readily apparent in view of the detailed description provided below, including the accompanying drawings.

DETAILED DESCRIPTION

Figure 1:
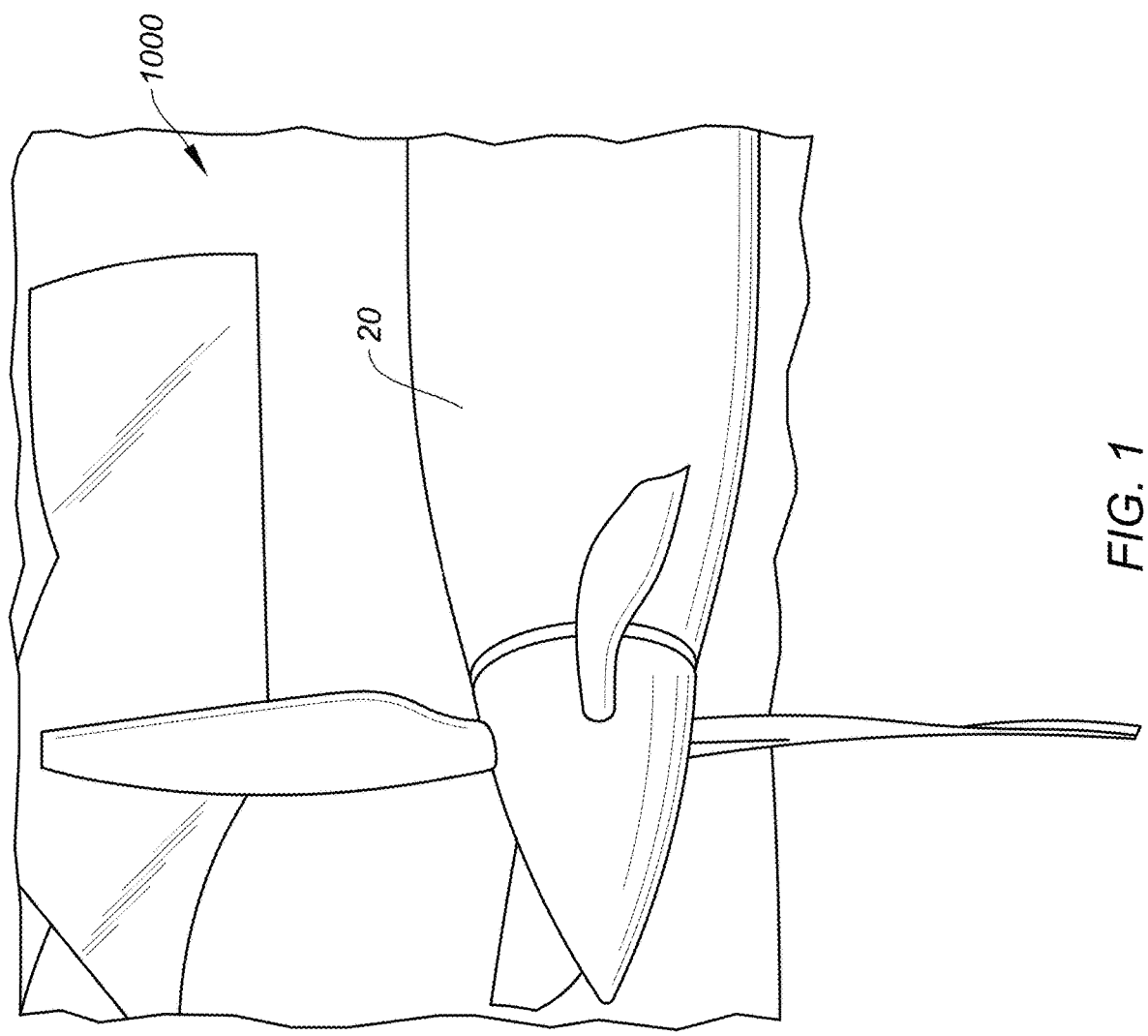
FIG. 1 illustrates an aircraft including a propulsion system, in accordance with one or more embodiments of the present disclosure.

FIG. 1 illustrates an aircraft 1000 including at least one propulsion system 20. Briefly, the aircraft may be a fixed-wing aircraft (e.g., an airplane), a rotary-wing aircraft (e.g., a helicopter), a tilt-rotor aircraft, a tilt-wing aircraft, or another aerial vehicle. Moreover, the aircraft may be a manned aerial vehicle or an unmanned aerial vehicle (UAV, e.g., a drone). The propulsion system 20 of FIG. 1 is a hybrid-electric propulsion system including an engine 22, an electrical assembly 24, a control assembly 26, and a propulsor 28.

Figure 2:
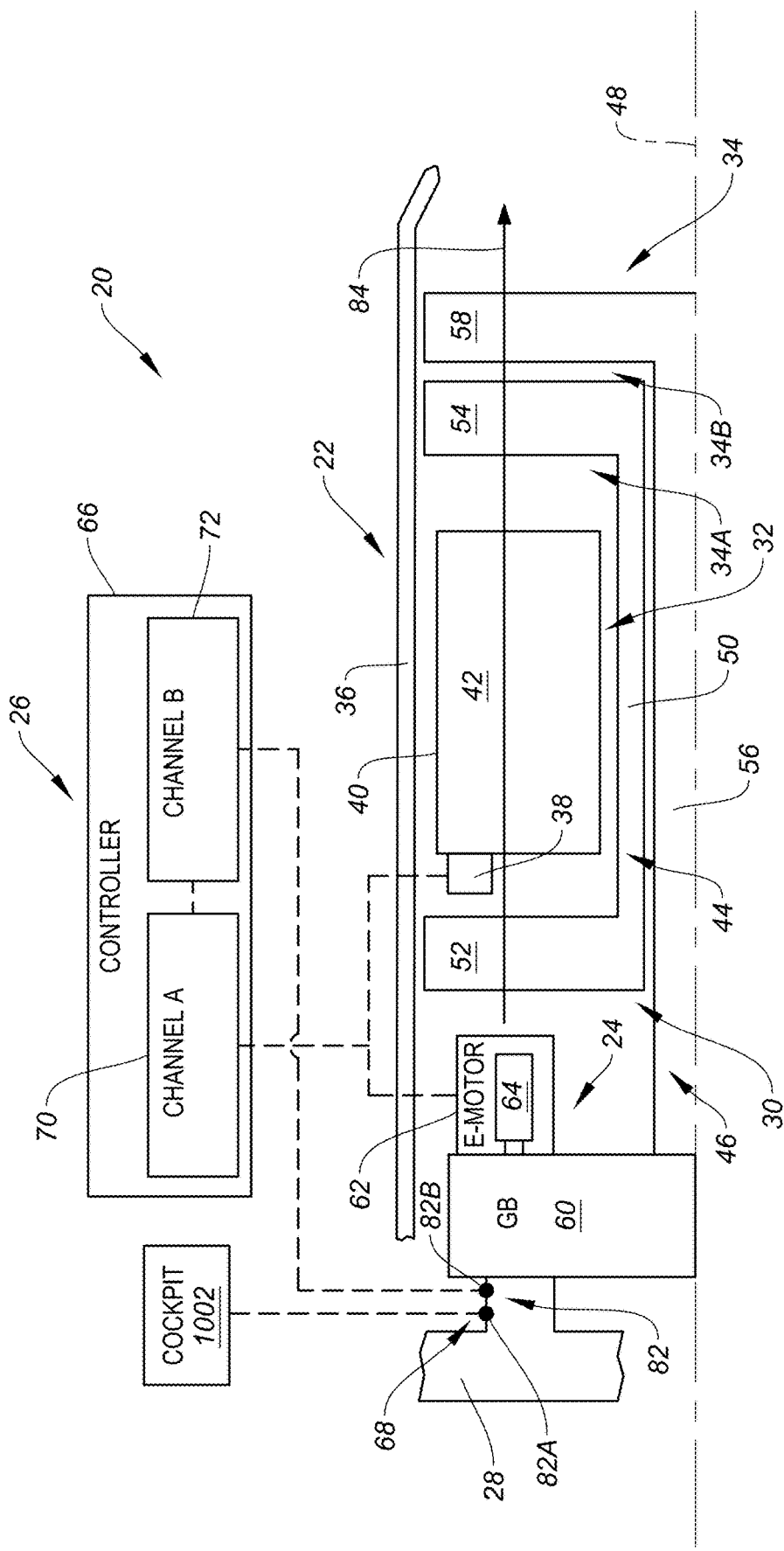
FIG. 2 schematically illustrates a cutaway, side view of an aircraft propulsion system, in accordance with one or more embodiments of the present disclosure.

FIG. 2 schematically illustrates a cutaway, side view of the propulsion system 20. The engine 22 of FIG. 2 is configured as a turboprop gas turbine engine. However, the present disclosure is not limited to any particular configuration of gas turbine engine for the propulsion system 20, and examples of gas turbine engine configurations for the propulsion system 20 may include, but are not limited to, a turbofan engine, a turbojet engine, a propfan engine, or the like. Moreover, the present disclosure is not limited to propulsion systems including a gas turbine engine. For example, the engine 22 may alternatively be configured as an intermittent combustion engine such as, but not limited to, a rotary engine (e.g., a Wankel engine), a piston engine, or the like.

The engine 22 of FIG. 2 includes a compressor section 30, a combustor section 32, a turbine section 34, and an engine static structure 36. The combustor section 32 includes a fuel injection assembly 38 and a combustor 40 (e.g., an annular combustor). The combustor 40 forms a combustion chamber 42. The turbine section 34 includes a high-pressure turbine section 34A and a power turbine section 34B.

Components of the compressor section 30 and the turbine section 34 of FIG. 2 form a first rotational assembly 44 (e.g., a high-pressure spool) and a second rotational assembly 46 of the engine 22. The first rotational assembly 44 and the second rotational assembly 46 are mounted for rotation about a rotational axis 48 (e.g., an axial centerline) of the engine 22 relative to the engine static structure 36.

The first rotational assembly 44 includes a first shaft 50, a bladed compressor rotor 52 for the compressor section 30, and a bladed turbine rotor 54 for the high-pressure turbine section 34A. The first shaft 50 interconnects the bladed compressor rotor 52 and the bladed turbine rotor 54.

The second rotational assembly 46 of FIG. 2 includes a second shaft 56 and a bladed power turbine rotor 58 for the power turbine section 34B. The second shaft 56 is connected to the bladed power turbine rotor 58. The second shaft 56 operably connects (e.g., directly or indirectly connects) the bladed power turbine rotor 58 with the propulsor 28.

The engine static structure 36 includes engine casings, cowlings, and other fixed (e.g., non-rotating) structures of the engine 22 which house and/or support components of the engine 22 such as, but not limited to, those of the compressor section 30, the combustor section 32, and the turbine section 34. The engine static structure 36 includes one or more bearing assemblies and/or gear trains configured to rotationally support and/or interconnect components of the first rotational assembly 44 and the second rotational assembly 46. The engine static structure 36 of FIG. 2 includes a gear box 60 coupling the second shaft 56 and the propulsor 28. For example, the gear box 60 includes a gear assembly (e.g., an epicyclic gear assembly) coupling the second shaft 56 and the propulsor 28. The gear assembly may be a reduction gear assembly configured to drive rotation of the propulsor 28 at a reduced rotational speed relative to the second shaft 56. Of course, the second shaft 56 may alternatively be directly connected to the propulsor 28 to drive the propulsor 28 at the same rotational speed as the second shaft 56.

The electrical assembly 24 of FIG. 2 includes an electric motor 62. The electrical assembly 24 may include additional equipment (e.g., cables, generators, batteries, power transforming and conditioning equipment, etc.) for supplying electrical power to the electric motor 62 and to other electrical loads of the aircraft 1000 or its propulsion system(s) 20. The electric motor 62 includes a rotor 64. The rotor 64 is coupled to the propulsor 28 by the gear box 60. For example, the gear box 60 may couple both of the second shaft 56 and the rotor 64 to the propulsor 28 to facilitate driving rotation of the propulsor 28 with the bladed power turbine rotor 58 (e.g., via the second shaft 56), the electric motor 62 (e.g., the rotor 64), or a combination of the bladed power turbine rotor 58 and the electric motor 62. The electric motor 62 may additionally include a motor control unit (e.g., an inverter) configured to control electric power characteristics (e.g., frequency, voltage, current) supplied to the electric motor 62 (e.g., windings of the electric motor 62), for example, to control a rotation speed and/or torque of the rotor 64.

The control assembly 26 includes a controller 66 and a propulsion train sensor assembly 68. The controller 66 may form or otherwise be part of an electronic engine controller (EEC) for the engine 22. The EEC may control operating parameters of the engine 22 including, but not limited to, fuel flow, stator vane position (e.g., variable compressor inlet guide vane (IGV) position), compressor air bleed valve position, shaft (e.g., first shaft 50 and/or second shaft 56) torque and/or rotation speed, etc. so as to control an engine power or performance of the propulsion system 20. For example, the EEC may control the fuel injection assembly 38 to modulate fuel flow to the combustor 40 to obtain a desired output power of the engine 22. In some embodiments, the EEC may be part of a full authority digital engine control (FADEC) system for the engine 22.

The controller 66 of FIG. 2 is configured as a dual-channel controller. For example, the controller 66 of FIG. 2 includes one or more channel A control units 70 and one or more channel B control units 72. As will be discussed in further detail, the channel A control units 70 may control respective power outputs of the engine 22 and the electric motor 62 applied to the propulsor 28 to control a thrust output of the propulsion system 20 as well as respective loading conditions of the engine 22 and the electric motor 62. In contrast, the channel B control units 72 may monitor propulsion train parameters of the propulsion system 20 (e.g., parameters measured using the propulsion train sensor assembly 68) as well as control signal outputs of the channel A control units 70 (e.g., for controlling operation of the engine 22 and the electric motor 62) to verify proper operation of the channel A control units 72 during operation of the propulsion system 20. In some embodiments, the channel B control units 72 may be configured to assume control of the engine 22 and/or the electric motor 62 in response to identifying a failure or degraded operation of one or more of the channel A control units 70.

Figure 3:
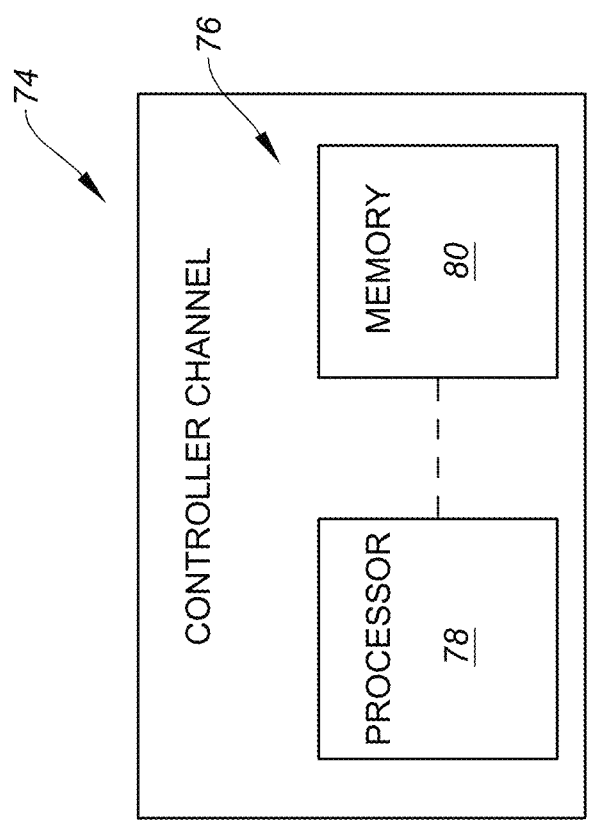
FIG. 3 illustrates a control unit for an aircraft propulsion system control assembly, in accordance with one or more embodiments of the present disclosure.

FIG. 3 schematically illustrates a control unit 74. The control unit 74 of FIG. 3 may be used for one, more than one, or each of the channel A control units 70 and the channel B control units 72. For example, each of the channel A control units 70 and the channel B control units 72 may include the control unit 74 such that each of the channel A control units 70 and the channel B control units 72 includes a processing system 76 which is independent of the processing system 76 of each other one of the channel A control units 70 and the channel B control units 72. The processing system 76 of the control unit 74 includes a processor 78 connected in signal communication with memory 80. The processor 78 may include any type of computing device, computational circuit, processor(s), central processing unit (CPU), graphics processing unit (GPU), computer, or the like capable of executing a series of instructions that are stored in memory 80. Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. The instructions may include an operating system, and/or executable software modules such as program files, system data, buffers, drivers, utilities, and the like. The executable instructions may apply to any functionality described herein to enable the controller control unit 74 to accomplish the same algorithmically and/or coordination of propulsion system 20 components. The memory 80 may include a single memory device or a plurality of memory devices (e.g., a computer-readable storage device that can be read, written, or otherwise accessed by a general purpose or special purpose computing device, including any processing electronics and/or processing circuitry capable of executing instructions). The present disclosure is not limited to any particular type of memory device, which may be non-transitory, and may include read-only memory, random access memory, volatile memory, non-volatile memory, static memory, dynamic memory, flash memory, cache memory, volatile or non-volatile semiconductor memory, optical disk storage, magnetic disk storage, magnetic tape, other magnetic storage devices, or any other medium capable of storing one or more instructions, and/or any device that stores digital information. The memory device(s) may be directly and/or indirectly coupled to the control unit 74. The control unit 74 may include, or may be in communication with, a user interface including one or more inputs devices and/or one or more output devices, for example, an input device that enables a user to enter data and/or instructions and an output device configured to display information (e.g., a visual display or a printer), or to transfer data, etc. Communications between the control unit 74 and external electrical or electronic devices may be via a hardwire connection or via a wireless connection. A person of skill in the art will recognize that portions of the control unit 74 may assume various forms (e.g., digital signal processor, analog device, etc.) capable of performing the functions described herein.

The propulsion train sensor assembly 68 includes a plurality of propulsion train sensors 82. The propulsion train sensors 82 include one or more channel A sensors 82A and one or more channel B sensors 82B. The channel A sensors 82A and the channel B sensors 82B are configured to measure operational parameters of the propulsor 28. For example, each of the channel A sensors 82A and the channel B sensors 82B may include a rotation speed sensor, a torque sensor, a vibration sensor, or the like configured to measure operational parameters of the propulsor 28. Each of the channel A sensors 82A and the channel B sensors 82B, as described in the present disclosure, are mechanically arranged downstream of the engine 22 output (e.g., the second shaft 56) and the electric motor 62 output (e.g., the rotor 64) to measure a combined output of the engine 22 and the electric motor 62 to the propulsor 28. In other words, the channel A sensors 82A and the channel B sensors 82B are not configured to measure operational parameters (e.g., rotation speed, torque, etc.) of the engine 22 (e.g., the second shaft 56) and the electric motor 62 output (e.g., the rotor 64) individually. For example, the channel A sensors 82A and the channel B sensors 82B may be operably connected to the propulsor 28, an input shaft of the propulsor 28 (e.g., interconnecting the propulsor 28 with the gear box 60), or a portion of the gear assembly of the gear box 60. The channel A sensors 82A are connected in signal communication with a cockpit control system 1002 of the aircraft 1000. For example, operational parameters of the propulsor 28 measured by the channel A sensors 82A may be displayed on a cockpit display or other instrumentation of the cockpit control system 1002 for a pilot or other operator of the aircraft 1000 to facilitate control of the aircraft 1000 and its propulsion system(s) 20. The channel B sensors 82B are connected in signal communication with the channel B control units 72.

During operation of the propulsion system 20 of FIG. 2, ambient air enters the propulsion system 20 through an air intake into and through a core flow path 84 of the engine 22. The ambient air flow along the core flow path 84 is compressed in the compressor section 30 and directed into the combustion chamber 42 of the combustor 40 within the combustor section 32. The fuel injection assembly 38 injects fuel into the combustion chamber 42. The fuel is mixed with the compressed air to provide a fuel-air mixture. This fuel-air mixture is ignited, and combustion products thereof flow through the high-pressure turbine section 34A and the power turbine section 34B, and are exhausted from the propulsion system 20. The bladed turbine rotor 54 and the bladed power turbine rotor 58 rotationally drive the first rotational assembly 44 and the second rotational assembly 46, respectively, in response to the combustion gas flow through the high-pressure turbine section 34A and the power turbine section 34B. The second rotational assembly 46 (e.g., the second shaft 56) may drive rotation of the propulsor 28, for example, through the gear box 60. The electric motor 62 may be selectively operated (e.g., electrically driven) to drive rotation of the propulsor 28 independently or in combination with the engine 22.

As will be discussed in further detail, operation of the engine 22 and the electric motor 62 may be controlled by the channel A control units 70. For example, the channel A control units 70 may receive one or more command signals from the cockpit control system 1002 (e.g., the throttles operated by a pilot) and generate and direct one or more output control signals (e.g., to the fuel injection assembly 38 and/or the electric motor 62) to control operation of the engine 22 and/or the electric motor 62 to establish a commanded propulsor 28 or other propulsion system 20 response. The channel B control units 72 monitor performance of the channel A control units 70 for controlling operation of the engine 22 and the electric motor 62. The channel B control units 72 may directly process measurement signals from the channel B sensors 82B to evaluate the channel A control unit 70 performance (e.g., output control signals) in response to command signals from the cockpit control system 1002. For example, the channel B control units 72 (e.g., the memory 80) may include instructions which, when executed (e.g., by the processor 78), cause the channel B control units 72 to identify valid and invalid output control signals of the channel A control units 70 (e.g., an engine control unit and/or an electric motor control unit). The channel B control units 72 may identify an output control signal of the channel A control units 70 as valid where the output control signal is within a threshold range calculated by the channel B control units 72 (e.g., based on command signals from the cockpit control system 1002 and/or measurement signals from the channel B sensors 82B). The channel B control units 72 may identify an output control signal of the channel A control units 70 as invalid where the output control signal is outside of the threshold range calculated by the channel B control units 72. The channel B control units 72 may have limited control functionality for the electric motor 62. The channel B control units 72 may have limited control functionality for the electric motor 62. For example, the channel B control units 72 may be configured to shut down (e.g., deenergize) the electric motor 62 in response to identification of improper operation of the electric motor 62 (e.g., an overtorque condition caused by uncommanded operation of the electric motor 62 or an invalid output control signal to the electric motor 62).

Figure 4:
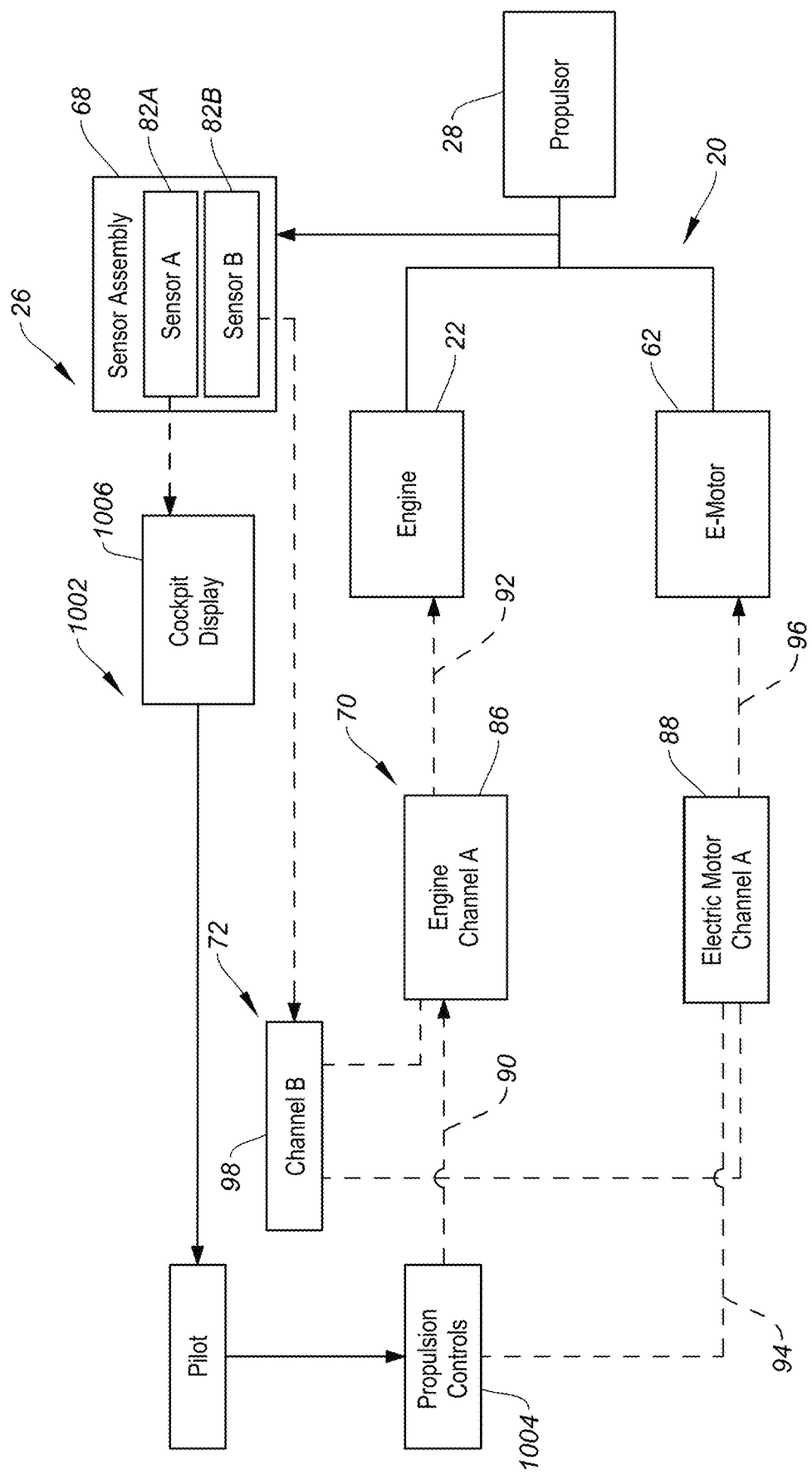
FIG. 4 schematically illustrates an aircraft propulsion system control assembly, in accordance with one or more embodiments of the present disclosure.

FIG. 4 schematically illustrates an embodiment of the control assembly 26. The channel A control units 70 of FIG. 4 include an engine control unit 86 and an electric motor control unit 88. The engine control unit 86 is configured to control operation of the engine 22 by controlling a power output of the engine 22 to the propulsor 28, for example, as discussed above. The engine control unit 86 may receive a command signal 90 from propulsion controls 1004 (e.g., a pilot-operated control device) of the cockpit control system 1002 and generate and direct one or more output control signals 92 to the engine 22 (e.g., the fuel injection assembly 38) to control operation of the engine 22 (see FIG. 2). The electric motor control unit 88 is configured to control operation of the electric motor 62 by controlling a power output of the electric motor 62 to the propulsor 28, for example, as discussed above. The electric motor control unit 88 may receive a command signal 94 from the propulsion controls 1004 and generate and direct one or more output control signals 96 to the electric motor 62 to control operation of the electric motor 62 (see FIG. 2). Measured operating parameters of the propulsor 28, from the channel A sensors 82A may be displayed on a cockpit display 1006 of the cockpit control system 1002 for evaluation by a pilot. The channel B control units 70 of FIG. 4 include a single channel B control unit 98. The channel B control unit 98 is configured to monitor performance of the engine control unit 86 and the electric motor control unit 88 for controlling operation of the engine 22 and the electric motor 62, respectively. The channel B control unit 98 is configured to directly process measurement signals from the channel B sensors 82B to evaluate the engine control unit 86 and the electric motor control unit 88 control signals 92, 96 in response to the respective command signals 90, 94 from the propulsion controls 1004.

The configuration of the channel B sensors 82B at the propulsor 28 facilitates a reduced quantity of propulsion train sensors as well as independent monitoring of the engine control unit 86 and the electric motor control unit 88 with the single channel B control unit 98. Accordingly, the present disclosure configuration of the channel B sensors 82B and the channel B control units 72 (e.g., the channel B control unit 98 of FIG. 4) may facilitate reduced control assembly 26 weight, cost, and complexity, at least in comparison to some conventional control systems for hybrid-electric propulsion systems which may monitor operation and control of an engine and electric motor using discrete, independent control units.

Figure 5:
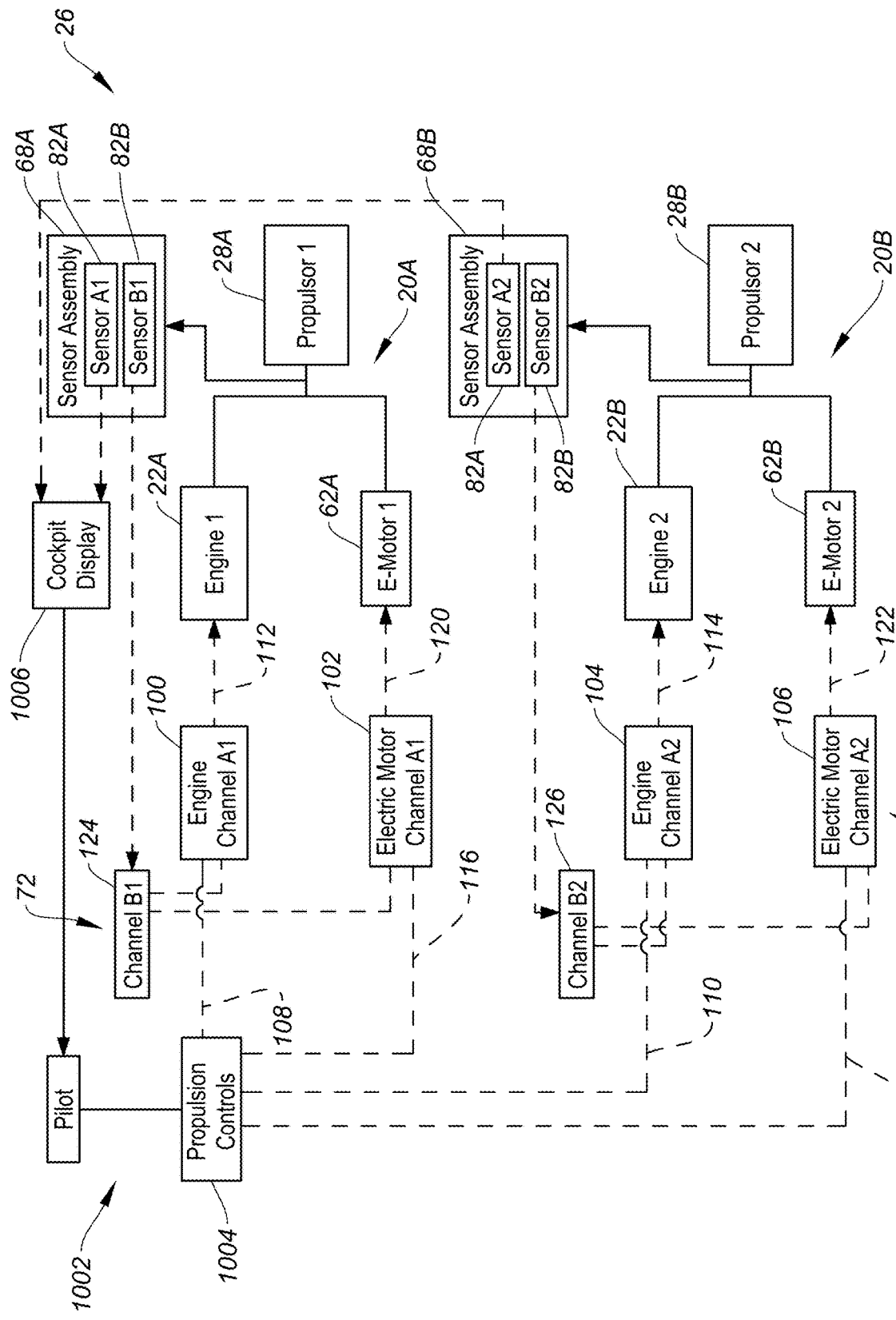
FIG. 5 schematically illustrates another aircraft propulsion system control assembly, in accordance with one or more embodiments of the present disclosure.

FIG. 5 schematically illustrates another embodiment of the control assembly 26 for an aircraft (e.g., the aircraft 1000 of FIG. 1) including two propulsion systems 20-a first propulsion system 20A and a second propulsion system 20B. The first propulsion system 20A includes a first engine 22A and a first electric motor 62A coupled with a first propulsor 28A. The second propulsion system 20B includes a second engine 22B and a second electric motor 62B coupled with a second propulsor 28B. The control assembly 26 includes a first propulsion train sensor assembly 68A for the first propulsion system 20A and a second propulsion train sensor assembly 68B for the second propulsion system 20B. The first propulsion train sensor assembly 68A and the second propulsion train sensor assembly 68B have a configuration which is the same as or similar to that described above for the propulsion train sensor assembly 68 of FIG. 2. The channel A control units 70 of FIG. 5 include a first engine control unit 100 for the first engine 22A, a first electric motor control unit 102 for the first electric motor 62A, a second engine control unit 104 for the second engine 22B, and a second electric motor control unit 106 for the second electric motor 62B. The engine control units 100, 104 are respectively configured to control operation of the engines 22A, 22B by controlling a power output of the engines 22A, 22B to the propulsors 28A, 28B, for example, as discussed above. Each of the engine control units 100, 104 may receive a respective command signal 108, 110 from the propulsion controls 1004 and generate and direct one or more respective output control signals 112, 114 to the engines 22A, 22B to control operation of the engines 22A, 22B. The electric motor control units 102, 106 are respectively configured to control operation of the electric motors 62A, 62B by controlling a power output of the electric motors 62A, 62B to the propulsors 28A, 28B, for example, as discussed above. Each of the electric motor control units 102, 106 may receive a respective command signal 116, 118 from the propulsion controls 1004 and generate and direct one or more respective output control signals 120, 122 to the electric motors 62A, 62B to control operation of the electric motors 62A, 62B.

The channel B control units 70 of FIG. 5 include a first channel B control unit 124 for the first propulsion system 20A and a second channel B control unit 126 for the second propulsion system 20B. The first channel B control unit 124 is configured to monitor performance of the first engine control unit 100 and the first electric motor control unit 102 for controlling operation of the first engine 22A and the first electric motor 62A, respectively. The first channel B control unit 124 is configured to directly process measurement signals from the channel B sensors 82B of the first propulsion train sensor assembly 68A to evaluate the first engine control unit 100 and the first electric motor control unit 102 control signals 112, 120 in response to the respective command signals 108, 116 from the propulsion controls 1004. The second channel B control unit 126 is configured to monitor performance of the second engine control unit 104 and the second electric motor control unit 106 for controlling operation of the second engine 22B and the second electric motor 62B, respectively. The second channel B control unit 126 is configured to directly process measurement signals from the channel B sensors 82B of the second propulsion train sensor assembly 68B to evaluate the second engine control unit 104 and the second electric motor control unit 106 control signals 114, 122 in response to the respective command signals 110, 118 from the propulsion controls 1004.

Figure 6:
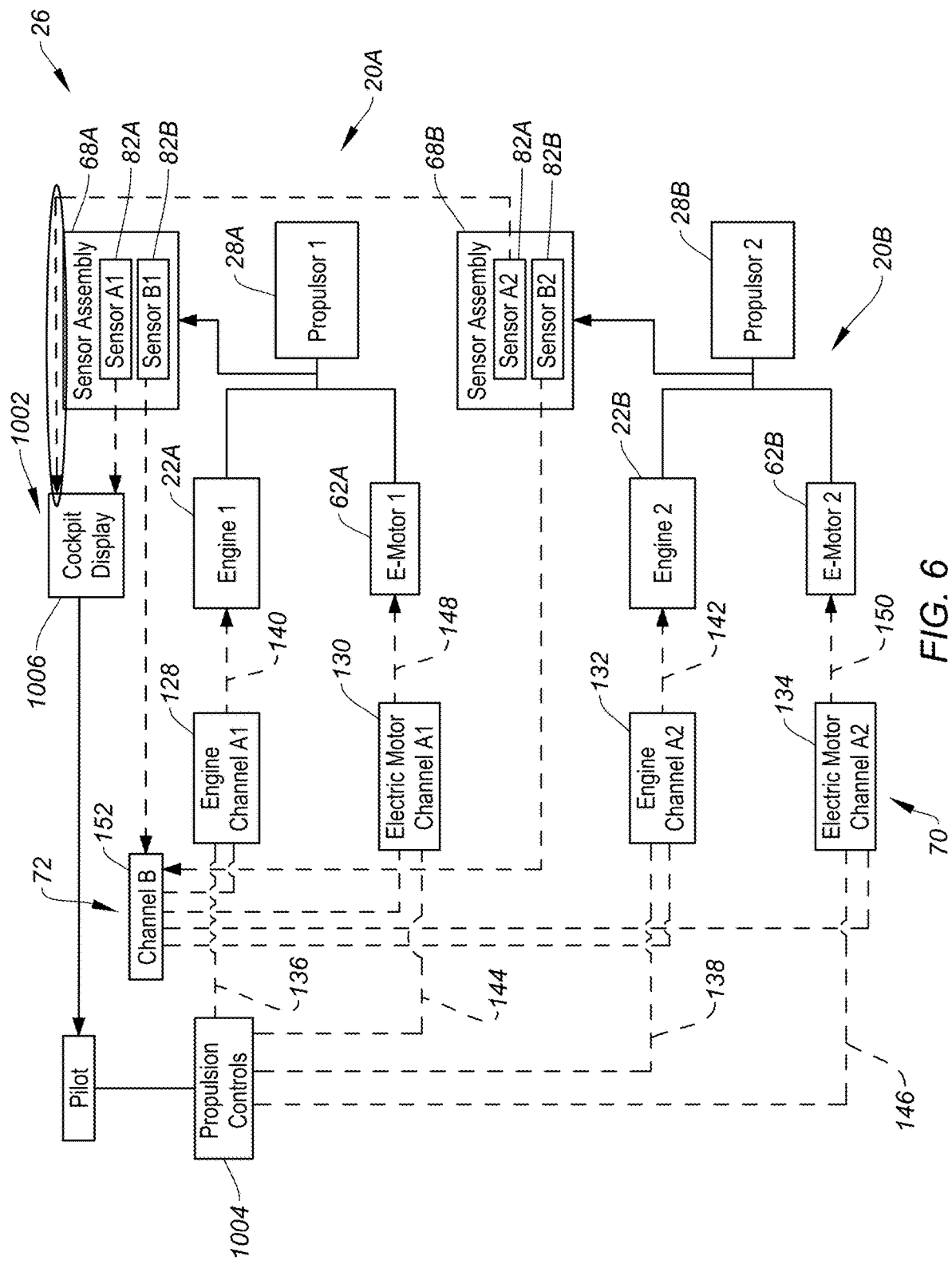
FIG. 6 schematically illustrates another aircraft propulsion system control assembly, in accordance with one or more embodiments of the present disclosure.

FIG. 6 schematically illustrates another embodiment of the control assembly 26 for an aircraft (e.g., the aircraft 1000 of FIG. 1) including two propulsion systems 20—the first propulsion system 20A and the second propulsion system 20B. The first propulsion system 20A includes the first engine 22A and the first electric motor 62A coupled with the first propulsor 28A. The second propulsion system 20B includes the second engine 22B and the second electric motor 62B coupled with the second propulsor 28B. The control assembly 26 includes the propulsion train sensor assembly 68 (e.g., a single propulsion train sensor assembly) for the first propulsion system 20A and the second propulsion system 20B. Each of the propulsion train sensors 82 of the propulsion train sensor assembly 68 are connected in signal communication with the cockpit control system 1002 (e.g., the cockpit display 1006) and the channel B control units 72. The propulsion train sensor assembly 68 of FIG. 6 has a configuration for the first propulsion system 20A and the second propulsion system 20B which is the same as or similar to that described above for the propulsion train sensor assembly 68 of FIG. 2. The channel A control units 70 of FIG. 6 include a first engine control unit 128 for the first engine 22A, a first electric motor control unit 130 for the first electric motor 62A, a second engine control unit 132 for the second engine 22B, and a second electric motor control unit 134 for the second electric motor 62B. The engine control units 128, 132 are respectively configured to control operation of the engines 22A, 22B by controlling a power output of the engines 22A, 22B to the propulsors 28A, 28B, for example, as discussed above. Each of the engine control units 128, 132 may receive a respective command signal 136, 138 from the propulsion controls 1004 and generate and direct one or more respective output control signals 140, 142 to the engines 22A, 22B to control operation of the engines 22A, 22B. The electric motor control units 130, 134 are respectively configured to control operation of the electric motors 62A, 62B by controlling a power output of the electric motors 62A, 62B to the propulsors 28A, 28B, for example, as discussed above. Each of the electric motor control units 130, 134 may receive a respective command signal 144, 146 from the propulsion controls 1004 and generate and direct one or more respective output control signals 148, 150 to the electric motors 62A, 62B to control operation of the electric motors 62A, 62B.

The channel B control units 70 of FIG. 6 include a single channel B control unit 152. The channel B control unit 152 of FIG. 6 is configured to monitor performance of the first engine control unit 128, the first electric motor control unit 130, the second engine control unit 132, and the second electric motor control unit 134 for controlling operation of the first engine 22A, the first electric motor 62A, the second engine 22B, and the second electric motor 62B respectively. The channel B control unit 152 is configured to directly process measurement signals from the propulsion train sensors 82 to evaluate the first engine control unit 128 and the first electric motor control unit 130 control signals 140, 148 in response to the respective command signals 136, 144 from the propulsion controls 1004. The channel B control unit 152 is also configured to monitor performance of the second engine control unit 132 and the second electric motor control unit 134 for controlling operation of the second engine 22B and the second electric motor 62B, respectively. The channel B control unit 152 is configured to directly process measurement signals from the propulsion train sensors 82 to evaluate the second engine control unit 132 and the second electric motor control unit 134 control signals 142, 150 in response to the respective command signals 138, 146 from the propulsion controls 1004. The configuration of the control assembly 26 of FIG. 6 facilitates a further reduced quantity of propulsion train sensors as well as independent monitoring of the engine control units and electric motor control units for a propulsion system assembly including a plurality of aircraft propulsion systems. Accordingly, the present disclosure configuration of the control assembly 26 of FIG. 6 may facilitate reduced control assembly 26 weight, cost, and complexity, at least in comparison to some conventional control systems.

Figure 7:
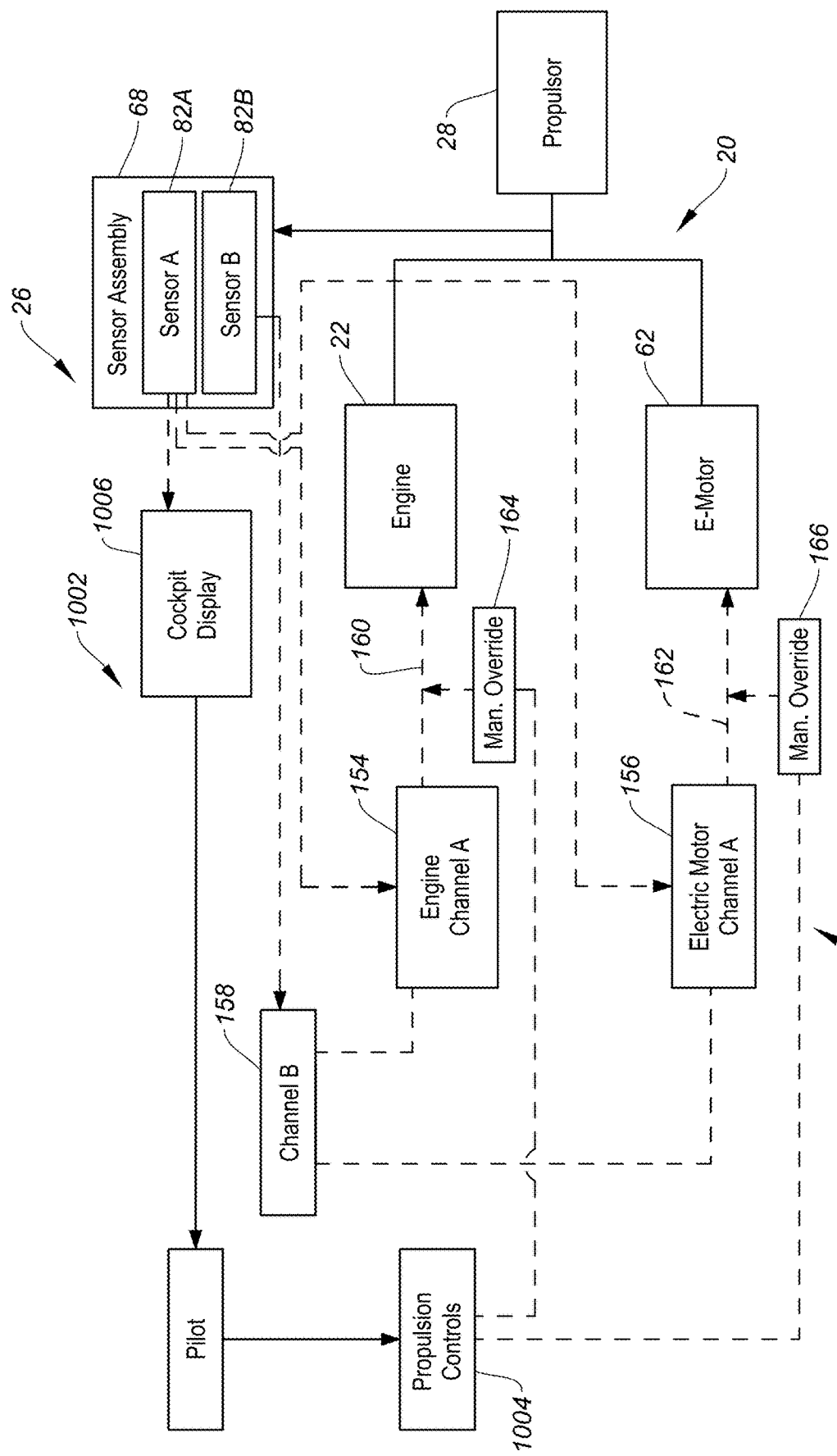
FIG. 7 schematically illustrates another aircraft propulsion system control assembly, in accordance with one or more embodiments of the present disclosure.

FIG. 7 schematically illustrates another embodiment of the control assembly 26. The channel A control units 70 of FIG. 7 include an engine control unit 154 and an electric motor control unit 156. The channel B control units 70 of FIG. 7 include a single channel B control unit 158. The control assembly 26 includes the propulsion train sensor assembly 68 (e.g., a single propulsion train sensor assembly). Each of the propulsion train sensors 82 of the propulsion train sensor assembly 68 are connected in signal communication with the cockpit control system 1002 (e.g., the cockpit display 1006), the engine control unit 154, the electric motor control unit 156, and the channel B control unit 158. The engine control unit 154 is configured to control operation of the engine 22 by controlling a power output of the engine 22 to the propulsor 28 using measured operating parameters of the propulsor 28 from the propulsion train sensors 82 (e.g., based on a propulsion flight plan or other automated propulsion control sequence, algorithm, model, or the like). The engine control unit 154 of FIG. 7 generates and directs one or more output control signals 160 to the engine 22 (e.g., the fuel injection assembly 38) to control operation of the engine 22 (see FIG. 2). The electric motor control unit 156 is configured to control operation of the electric motor 62 by controlling a power output of the electric motor 62 to the propulsor 28 using measured operating parameters of the propulsor 28 from the propulsion train sensors 82 (e.g., based on a propulsion flight plan or other automated propulsion control sequence, algorithm, model, or the like). The electric motor control unit 156 generates and directs one or more output control signals 162 to the electric motor 62 to control operation of the electric motor 62. The channel B control unit 158 is configured to monitor performance of the engine control unit 154 and the electric motor control unit 156 for controlling operation of the engine 22 and the electric motor 62, respectively. The channel B control unit 158 is configured to directly process measurement signals from the propulsion train sensors 82 to evaluate the engine control unit 154 and the electric motor control unit 156 control signals 160, 162 in response to the measured operating parameters of the propulsor 28 from the propulsion train sensors 82. The control assembly 26 of FIG. 7 may additionally include an engine manual override 164 and an electric motor manual override 166. The engine manual override 164 facilitates manual control of the engine 22 by the propulsion controls 1004, for example, in response to a failure or other degradation of the engine control unit 154. Similarly, the electric motor manual override 166 facilitates manual control of the electric motor 62 by the propulsion controls 1004.

Figure 8:
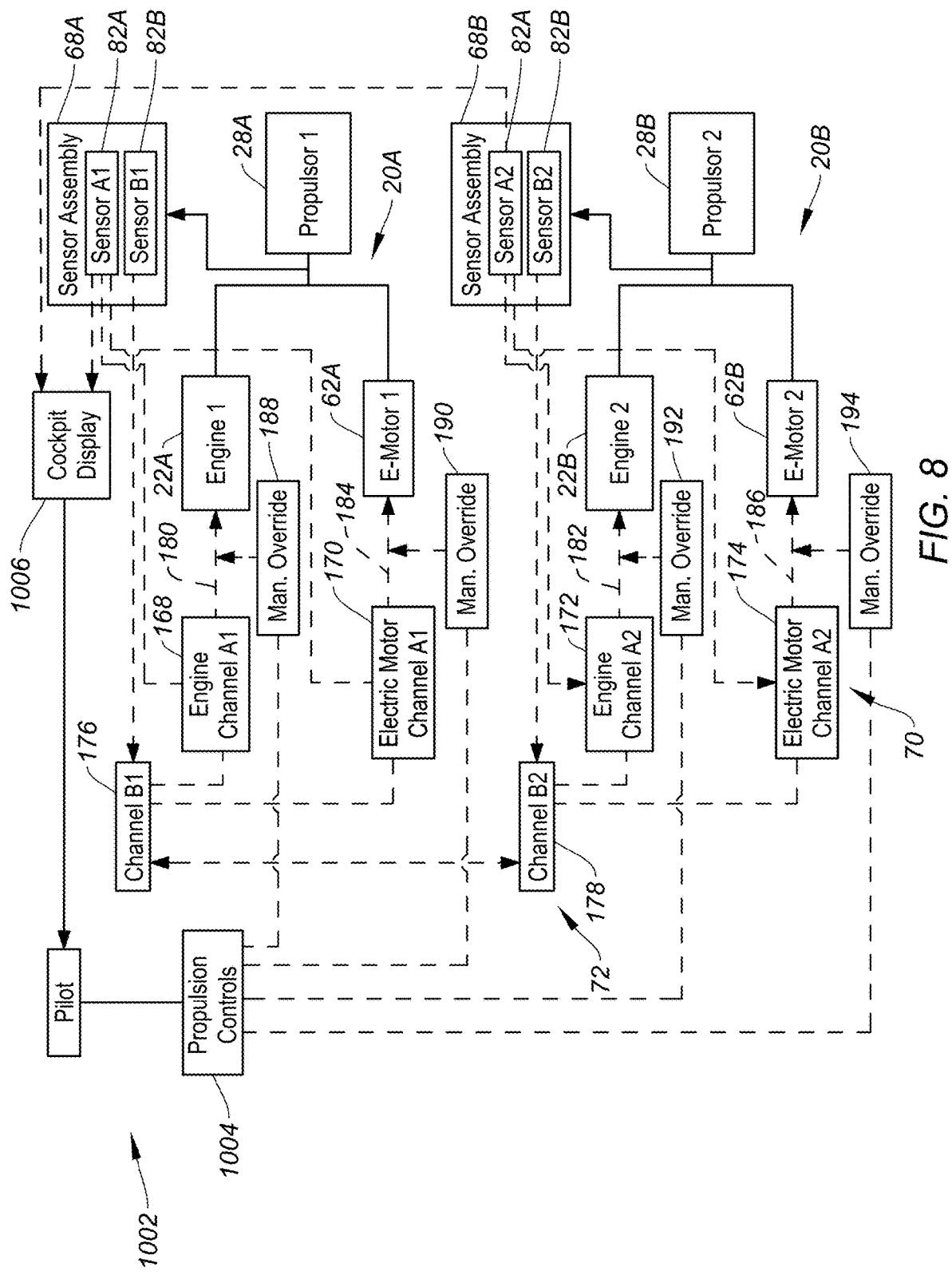
FIG. 8 schematically illustrates another aircraft propulsion system control assembly, in accordance with one or more embodiments of the present disclosure.

FIG. 8 schematically illustrates another embodiment of the control assembly 26 for an aircraft (e.g., the aircraft 1000 of FIG. 1) including two propulsion systems 20—the first propulsion system 20A and the second propulsion system 20B. The first propulsion system 20A includes the first engine 22A and the first electric motor 62A coupled with the first propulsor 28A. The second propulsion system 20B includes the second engine 22B and the second electric motor 62B coupled with the second propulsor 28B. The channel A control units 70 of FIG. 8 include a first engine control unit 168 for the first engine 22A, a first electric motor control unit 170 for the first electric motor 62A, a second engine control unit 172 for the second engine 22B, and a second electric motor control unit 174 for the second electric motor 62B. The channel B control units 70 of FIG. 8 include a first channel B control unit 176 for the first propulsion system 20A and a second channel B control unit 178 for the second propulsion system 20B. The control assembly 26 includes the first propulsion train sensor assembly 68A for the first propulsion system 20A and the second propulsion train sensor assembly 68B for the second propulsion system 20B. Each of the propulsion train sensors 82 of the first propulsion train sensor assembly 68A are connected in signal communication with the cockpit control system 1002 (e.g., the cockpit display 1006), the first engine control unit 168, the first electric motor control unit 170, and the first channel B control unit 176. Each of the propulsion train sensors 82 of the second propulsion train sensor assembly 68B are connected in signal communication with the cockpit control system 1002 (e.g., the cockpit display 1006), the second engine control unit 172, the second electric motor control unit 174, and the second channel B control unit 178.

The engine control units 168, 172 are respectively configured to control operation of the engines 22A, 22B by controlling a power output of the engines 22A, 22B to the propulsors 28A, 28B using measured operating parameters of the propulsor 28A, 28B from the propulsion train sensor assemblies 68A, 68B. Each of the engine control units 168, 172 generates and directs one or more respective output control signals 180, 182 to the engines 22A, 22B to control operation of the engines 22A, 22B. The electric motor control units 170, 174 are respectively configured to control operation of the electric motors 62A, 62B by controlling a power output of the electric motors 62A, 62B to the propulsors 28A, 28B using measured operating parameters of the propulsor 28A, 28B from the propulsion train sensor assemblies 68A, 68B. Each of the electric motor control units 170, 174 generates and directs one or more respective output control signals 184, 186 to the electric motors 62A, 62B to control operation of the electric motors 62A, 62B.

The first channel B control unit 176 is configured to monitor performance of the first engine control unit 168 and the first electric motor control unit 170 for controlling operation of the first engine 22A and the first electric motor 62A, respectively. The first channel B control unit 176 is configured to directly process measurement signals from the first propulsion train sensor assembly 68A to evaluate the first engine control unit 168 and the first electric motor control unit 170 control signals 180, 184 in response to the measured operating parameters of the first propulsor 28A from the first propulsion train sensor assembly 68A. The second channel B control unit 178 is configured to monitor performance of the second engine control unit 172 and the second electric motor control unit 174 for controlling operation of the second engine 22B and the second electric motor 62B, respectively. The second channel B control unit 178 is configured to directly process measurement signals from the second propulsion train sensor assembly 68B to evaluate the second engine control unit 172 and the second electric motor control unit 174 control signals 184, 186 in response to the measured operating parameters of the second propulsor 28B from the second propulsion train sensor assembly 68B. The control assembly 26 of FIG. 8 may additionally include a first engine manual override 188, a first electric motor manual override 190, a second engine manual override 192, and a second electric motor manual override 194 to facilitate manual control of the first engine 22A, the first electric motor 62A, the second engine 22B, and/or the second electric motor 62B by the propulsion controls 1004.

Figure 9:
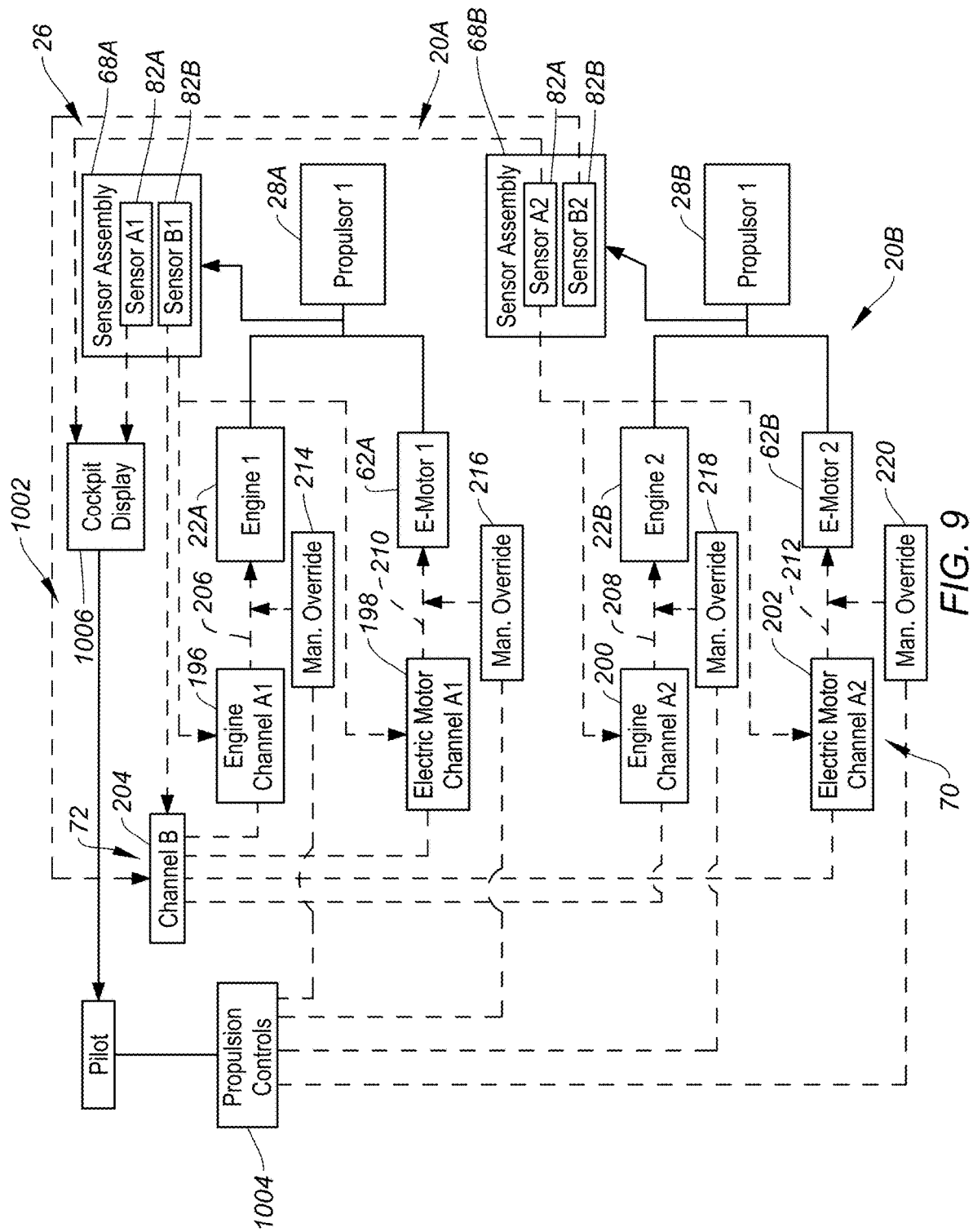
FIG. 9 schematically illustrates another aircraft propulsion system control assembly, in accordance with one or more embodiments of the present disclosure.

FIG. 9 schematically illustrates another embodiment of the control assembly 26 for an aircraft (e.g., the aircraft 1000 of FIG. 1) including two propulsion systems 20—the first propulsion system 20A and the second propulsion system 20B. The first propulsion system 20A includes the first engine 22A and the first electric motor 62A coupled with the first propulsor 28A. The second propulsion system 20B includes the second engine 22B and the second electric motor 62B coupled with the second propulsor 28B. The channel A control units 70 of FIG. 9 include a first engine control unit 196 for the first engine 22A, a first electric motor control unit 198 for the first electric motor 62A, a second engine control unit 200 for the second engine 22B, and a second electric motor control unit 202 for the second electric motor 62B. The channel B control units 70 of FIG. 9 include a single channel B control unit 204. The control assembly 26 includes the propulsion train sensor assembly 68 (e.g., a single propulsion train sensor assembly) for the first propulsion system 20A and the second propulsion system 20B. Each of the propulsion train sensors 82 of the propulsion train sensor assembly 68 are connected in signal communication with the cockpit control system 1002, the first engine control unit 196, the first electric motor control unit 198, the second engine control unit 200, the second electric motor control unit 202, and the channel B control unit 204.

The engine control units 196, 200 are respectively configured to control operation of the engines 22A, 22B by controlling a power output of the engines 22A, 22B to the propulsors 28A, 28B using measured operating parameters of the propulsor 28A, 28B from the propulsion train sensor assembly 68. Each of the engine control units 196, 200 generates and directs one or more respective output control signals 206, 208 to the engines 22A, 22B to control operation of the engines 22A, 22B. The electric motor control units 198, 202 are respectively configured to control operation of the electric motors 62A, 62B by controlling a power output of the electric motors 62A, 62B to the propulsors 28A, 28B using measured operating parameters of the propulsor 28A, 28B from the propulsion train sensor assembly 68. Each of the electric motor control units 198, 202 generates and directs one or more respective output control signals 210, 212 to the electric motors 62A, 62B to control operation of the electric motors 62A, 62B.

The channel B control unit 204 is configured to monitor performance of the first engine control unit 196, the first electric motor control unit 198, the second engine control unit 200, and the second electric motor control unit 202 for controlling operation of the first engine 22A and the first electric motor 62A, respectively. The channel B control unit 204 is configured to directly process measurement signals from the propulsion train sensor assembly 68 to evaluate the first engine control unit 196, the first electric motor control unit 198, the second engine control unit 200, and the second electric motor control unit 202 control signals 206, 208, 210, 212 in response to the measured operating parameters of the first propulsor 28A and the second propulsor 28B from the propulsion train sensor assembly 68. The control assembly 26 of FIG. 9 may additionally include a first engine manual override 214, a first electric motor manual override 216, a second engine manual override 218, and a second electric motor manual override 220 to facilitate manual control of the first engine 22A, the first electric motor 62A, the second engine 22B, and/or the second electric motor 62B by the propulsion controls 1004.

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details.

It is noted that the embodiments may be described as a process which is depicted as a flowchart, a flow diagram, a block diagram, etc. Although any one of these structures may describe the operations as a sequential process, many of the operations can be performed in parallel or concurrently. In addition, the order of the operations may be rearranged. A process may correspond to a method, a function, a procedure, a subroutine, a subprogram, etc.

The singular forms "a," "an," and "the" refer to one or more than one, unless the context clearly dictates otherwise. For example, the term "comprising a specimen" includes single or plural specimens and is considered equivalent to the phrase "comprising at least one specimen." The term "or" refers to a single element of stated alternative elements or a combination of two or more elements unless the context clearly indicates otherwise. As used herein, "comprises" means "includes." Thus, "comprising A or B," means "including A or B, or A and B," without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected, or the like may include permanent, removable, temporary, partial, full and/or any other possible attachment option.

The terms "substantially," "about," "approximately," and other similar terms of approximation used throughout this patent application are intended to encompass variations or ranges that are reasonable and customary in the relevant field. These terms should be construed as allowing for variations that do not alter the basic essence or functionality of the invention. Such variations may include, but are not limited to, variations due to manufacturing tolerances, materials used, or inherent characteristics of the elements described in the claims, and should be understood as falling within the scope of the claims unless explicitly stated otherwise.

No element, component, or method step in the present disclosure is intended to be dedicated to the public regardless of whether the element, component, or method step is explicitly recited in the claims. No claim element herein is to be construed under the provisions of 35 U.S.C. 112 (f) unless the element is expressly recited using the phrase "means for." As used herein, the terms "comprise", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements.

The invention claimed is:

1. An aircraft propulsion system assembly comprising:
a first aircraft propulsion system including a first propulsor, a first engine, and a first electrical assembly,
the first engine includes a first rotational assembly configured for rotation about a first engine rotational axis of the first engine, and the first rotational assembly is coupled to the first propulsor, and
the first electrical assembly includes a first electric motor, the first electric motor includes a first rotor, and the first rotor is coupled to the first propulsor; and
a control assembly including a propulsion system sensor assembly, a plurality of channel A control units, and at least one channel B control unit, the propulsion system sensor assembly is configured to directly measure one or both of a first rotation speed and a first torque of the first propulsor, the plurality of channel A control units includes a first engine control unit for the first engine and a first electric motor control unit for the first electric motor, the at least one channel B control unit is connected in signal communication with the propulsion system sensor assembly, the first engine control unit, and the first electric motor control unit, and the at least one channel B control unit includes a processor connected in signal communication with non-transitory memory including instructions which, when executed by the processor, cause the processor to:
identify valid and invalid output control signals of the first engine control unit and the first electric motor control unit using the one or both of the first rotation speed and the first torque.

2. The aircraft propulsion system assembly of claim 1, wherein the first aircraft propulsion system further includes a gear box, and the gear box couples the first rotational assembly and the first rotor to the first propulsor.

3. The aircraft propulsion system assembly of claim 1, wherein the at least one channel B control unit is a single channel B control unit connected in signal communication with the propulsion system sensor assembly, the first engine control unit, and the first electric motor control unit.

4. The aircraft propulsion system assembly of claim 3, wherein the first engine control unit and the first electric motor control unit are connected in signal communication with the propulsion system sensor assembly.

5. The aircraft propulsion system assembly of claim 1, further comprising a second aircraft propulsion system including a second propulsor, a second engine, and a second electrical assembly,
the second engine includes a second rotational assembly configured for rotation about a second engine rotational axis of the second engine, and the second rotational assembly is coupled to the second propulsor, and
the second electrical assembly includes a second electric motor, the second electric motor includes a second rotor, and the second rotor is coupled to the second propulsor;
wherein the propulsion system sensor assembly is configured to directly measure one or both of a second rotation speed and a second torque of the second propulsor, the plurality of channel A control units includes a second engine control unit for the second engine and a second electric motor control unit for the second electric motor, the at least one channel B control unit is connected in signal communication with the second engine control unit and the second electric motor control unit, and the instructions, when executed by the processor, further cause the processor to:
identify valid and invalid output control signals of the second engine control unit and the second electric motor control unit using the one or both of the second rotation speed and the second torque.

6. The aircraft propulsion system assembly of claim 5, wherein the at least one channel B control unit includes a first channel B control unit and a second channel B control unit, the first channel B control unit is connected in signal communication with the first engine control unit and the first electric motor control unit, and the second channel B control unit is connected in signal communication with the second engine control unit and the second electric motor control unit.

7. The aircraft propulsion system assembly of claim 5, wherein the at least one channel B control unit includes a single channel B control unit connected in signal communication with the first engine control unit, the first electric motor control unit, the second engine control unit, and the second electric motor control unit.

8. The aircraft propulsion system assembly of claim 5, wherein the first engine control unit, the first electric motor control unit, the second engine control unit, and the second electric motor control unit are connected in signal communication with the propulsion system sensor assembly.

9. The aircraft propulsion system assembly of claim 5, wherein the propulsion system sensor assembly includes a first sensor assembly and a second sensor assembly, the first sensor assembly is configured to directly measure the one or both of the first rotation speed and the first torque of the first propulsor, and the second sensor assembly is configured to directly measure the one or both of the second rotation speed and the second torque of the second propulsor.

10. The aircraft propulsion system assembly of claim 9, wherein the first engine control unit and the first electric motor control unit are connected in signal communication with the first sensor assembly and the second engine control unit and the second electric motor control unit are connected in signal communication with the second sensor assembly.

11. An aircraft propulsion system assembly comprising:
a cockpit control system;
an aircraft propulsion system including a propulsor, an engine, and an electrical assembly,
the engine includes a rotational assembly configured for rotation about an engine rotational axis of the engine, and the rotational assembly is coupled to the propulsor, and
the electrical assembly includes an electric motor, the electric motor includes a rotor, and the rotor is coupled to the propulsor; and
a control assembly including a propulsion system sensor assembly, a plurality of channel A control units, and at least one channel B control unit,
the propulsion system sensor assembly includes a plurality of sensors configured to directly measure one or both of a rotation speed and a torque of the propulsor, and the propulsion system sensor assembly is connected in signal communication with the cockpit control system and the at least one channel B control unit;
the plurality of channel A control units includes an engine control unit for the engine and an electric motor control unit for the electric motor, the engine control unit is configured to generate an output engine control signal for operation of the engine based on an input engine command signal from the cockpit control system, and the electric motor control unit is configured to generate an output electric motor control signal for operation of the electric motor based on an input electric motor command signal from the cockpit control system, and
the at least one channel B control unit includes a processor connected in signal communication with non-transitory memory including instructions which, when executed by the processor, cause the processor to:
identify valid and invalid output control signals of the output engine motor control signal and the output electric motor control signal using the one or both of the rotation speed and the torque.

12. The aircraft propulsion system assembly of claim 11, wherein the plurality of sensors includes at least one channel A sensor and at least one channel B sensor, each of the at least one channel A sensor and the at least one channel B sensor is configured to directly measure the one or both of the rotation speed and the torque of the propulsor, the at least one channel A sensor is connected in signal communication with the cockpit control system, and the at least one channel B sensor is connected in signal communication with the at least one channel B control unit.

13. The aircraft propulsion system assembly of claim 12, wherein the instructions, when executed by the processor, further cause the processor to identify the valid and invalid output control signals of the output engine motor control signal and the output electric motor control signal using the one or both of the rotation speed and the torque directly measured by the at least one channel B sensor.

14. The aircraft propulsion system assembly of claim 12, wherein the at least one channel B control unit is a single channel B control unit connected in signal communication with the at least one channel B sensor, the engine control unit, and the electric motor control unit.

15. The aircraft propulsion system assembly of claim 12, wherein each sensor of the plurality of sensors is mechanically arranged downstream of the rotational assembly and the rotor to directly measure the one or both of a rotation speed and a torque of the propulsor.

16. An aircraft propulsion system assembly comprising:
a cockpit control system;
an aircraft propulsion system including a propulsor, an engine, and an electrical assembly,
the engine includes a rotational assembly configured for rotation about an engine rotational axis of the engine, and the rotational assembly is coupled to the propulsor, and
the electrical assembly includes an electric motor, the electric motor includes a rotor, and the rotor is coupled to the propulsor; and
a control assembly including a propulsion system sensor assembly, a plurality of channel A control units, and at least one channel B control unit,
the propulsion system sensor assembly includes a plurality of sensors configured to directly measure one or both of a rotation speed and a torque of the propulsor, and the propulsion system sensor assembly is connected in signal communication with the cockpit control system, the plurality of channel A control units, and the at least one channel B control unit;
the plurality of channel A control units includes an engine control unit for the engine and an electric motor control unit for the electric motor, the engine control unit is configured to generate an output engine control signal for operation of the engine based on the one or both of the rotation speed and the torque, and the electric motor control unit is configured to generate an output electric motor control signal for operation of the electric motor based on one or both of the rotation speed and the torque, and
the at least one channel B control unit includes a processor connected in signal communication with non-transitory memory including instructions which, when executed by the processor, cause the processor to:
identify valid and invalid output control signals of the output engine motor control signal and the output electric motor control signal using the one or both of the rotation speed and the torque.

17. The aircraft propulsion system assembly of claim 16, wherein the cockpit control system includes a manual override for the output engine control signal and the output electric motor control signal.

18. The aircraft propulsion system assembly of claim 16, wherein each sensor of the plurality of sensors is mechanically arranged downstream of the rotational assembly and the rotor to directly measure the one or both of a rotation speed and a torque of the propulsor.

19. The aircraft propulsion system assembly of claim 16, wherein the aircraft propulsion system further includes a gear box, and the gear box couples the rotational assembly and the rotor to the propulsor.

20. The aircraft propulsion system assembly of claim 16, wherein the at least one channel B control unit includes a single channel B control unit connected in signal communication with the engine control unit, the electric motor control unit, and the propulsion system sensor assembly.

* * * * *